United States Patent
Kitamura

[11] Patent Number: 5,461,633
[45] Date of Patent: Oct. 24, 1995

[54] DISK DRIVE CIRCUIT WITH PARTIAL MATCH DETECTION FOR PREDETERMINED BIT SEQUENCE

[75] Inventor: Yoshiji Kitamura, Tokyo, Japan

[73] Assignee: NEC Corporation, Tokyo, Japan

[21] Appl. No.: 909,177

[22] Filed: Jul. 6, 1992

[30] Foreign Application Priority Data

Jul. 3, 1991 [JP] Japan ...................... 3-189314

[51] Int. Cl.$^6$ .................................. G06F 11/00
[52] U.S. Cl. ........................................ 371/47.1
[58] Field of Search ..................... 371/47.1, 27, 25.1, 371/24, 46, 42, 69.1, 5.1, 5.3, 67.1; 370/100.1; 360/78.14

[56] References Cited

U.S. PATENT DOCUMENTS 4,317,200  2/1982  Wakatsuki et al. ............... 371/25.1
4,775,977  10/1988  Dehara ........................... 371/25.1
4,933,786  6/1990  Wilson ........................... 360/78.14
5,023,612  6/1991  Liu ................................ 371/47.1

Primary Examiner—Robert W. Beausoliel, Jr.
Assistant Examiner—Phung Chung
Attorney, Agent, or Firm—Sughrue, Mion, Zinn, Macpeak & Seas

[57] ABSTRACT

In a disk drive where data bits containing a bit sequence signifying a specified location of a data block are read from a disk. A reference bit sequence identical to the recovered bit sequence is generated. Each of the recovered bit sequence and the reference bit sequence is divided into M groups of K bits. The M groups of the recovered bit sequence and the corresponding M groups of the reference bit sequence are compared with each other and a coincidence signal is produced for each of M pairs of compared groups when there is a bit-by-bit match therebetween. A match detector determines if the coincidence signal is generated from all pairs of the compared groups or from N out of M pairs of the compared groups.

7 Claims, 8 Drawing Sheets

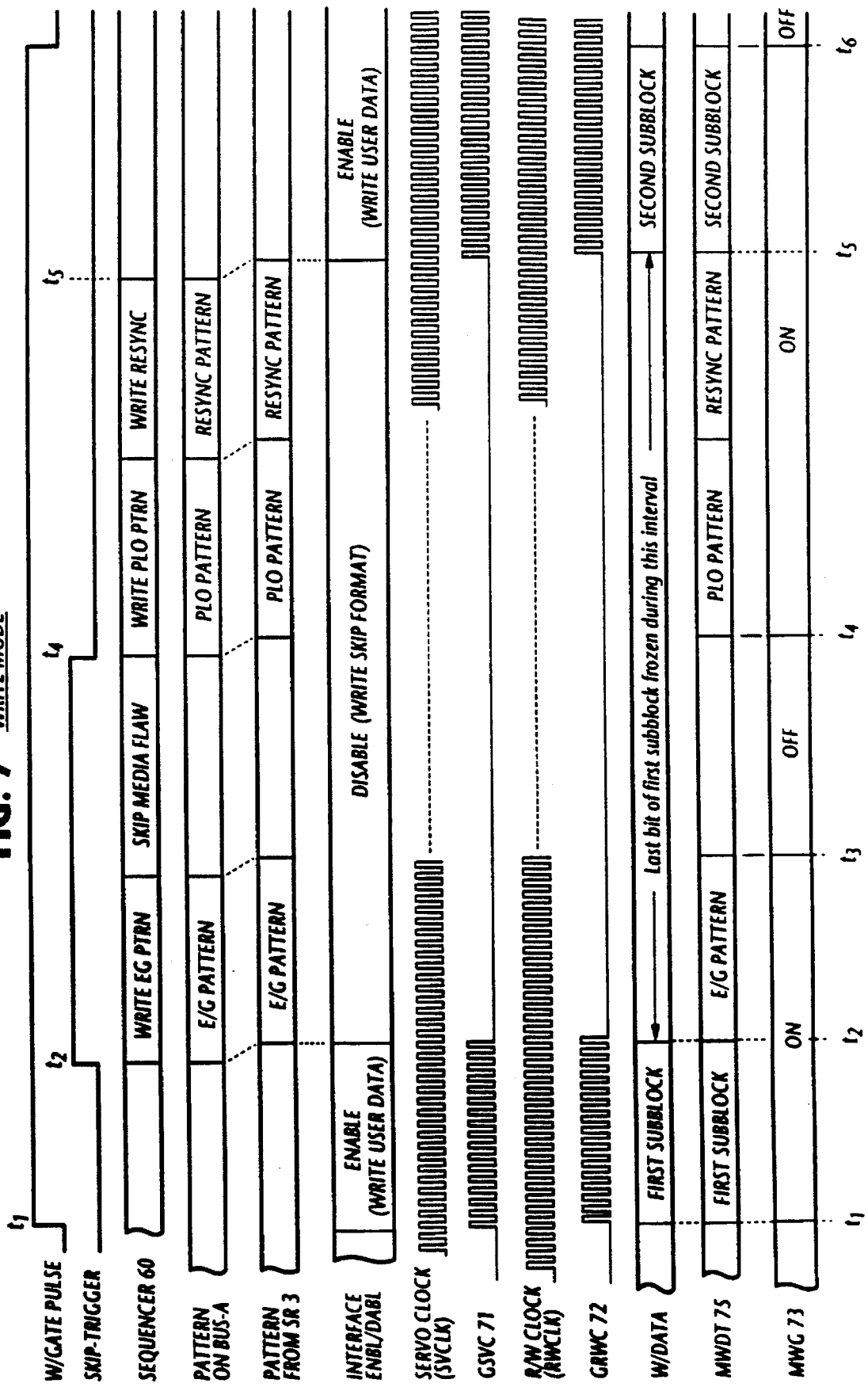

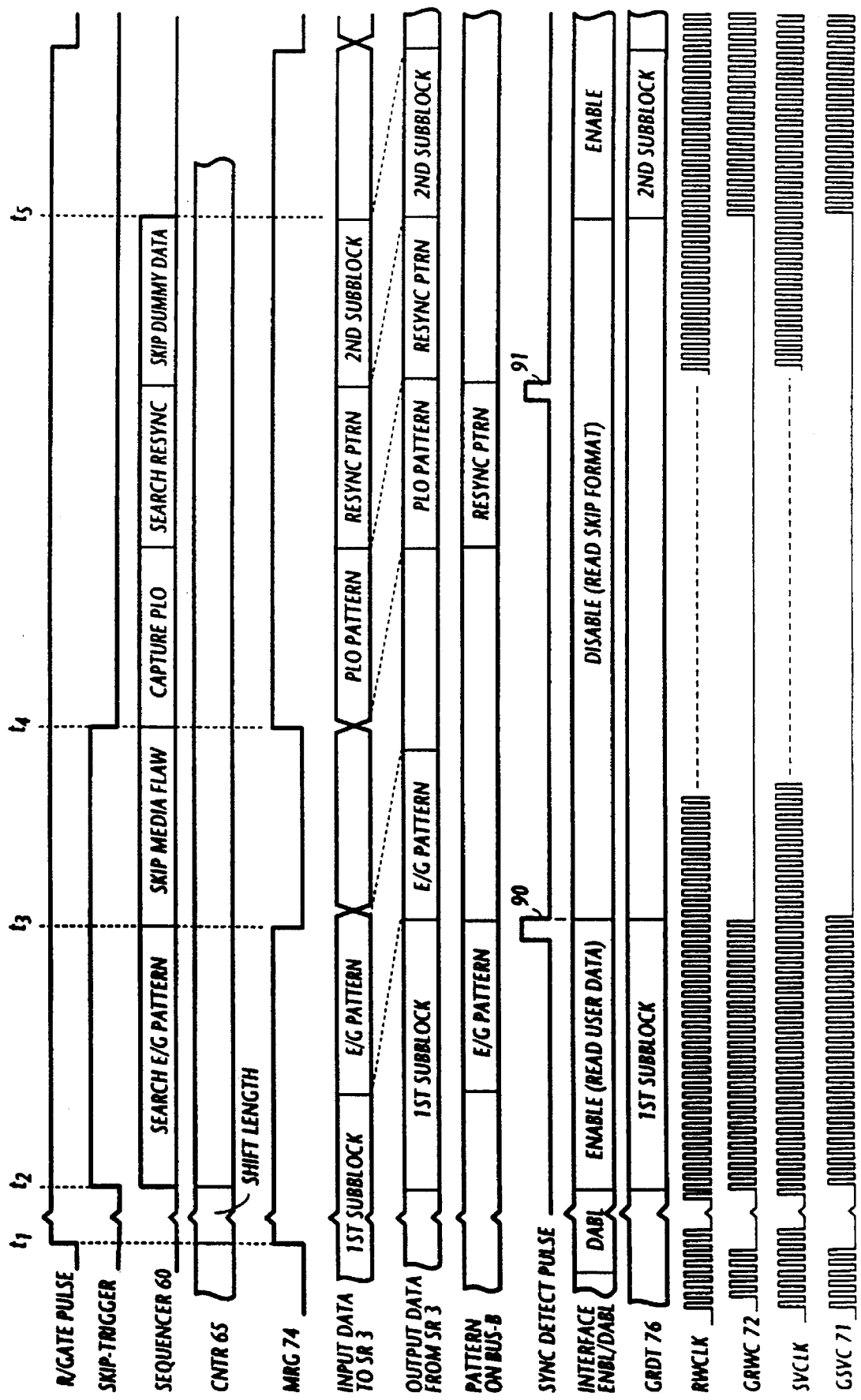

DISK DRIVE CIRCUIT WITH PARTIAL MATCH DETECTION FOR PREDETERMINED BIT SEQUENCE

BACKGROUND OF THE INVENTION

The present invention relates generally to disk drive control, and more particularly to a sync detection technique for properly detecting a predetermined bit sequence from a recording disk medium in which media flaws exist.

Recording of user data involves segmenting the data into blocks corresponding to tracks or sectors of a recording disk and writing a synchronization code at the starting point of each block. The user data is further divided into subblocks when a media flaw is discovered by a prescan test and the subblocks are spaced apart by a length sufficiently covering the detected flaw and a sync code is further attached to the subdivided data. When reading data from the disk, a reference bit sequence is generated and compared with the recorded sync code to detect proper timing for reading user data. With conventional disk drives, sync detection occurs only when there is a perfect bit-by-bit match between the recovered and reference bit sequences. However, small media flaws exist which are not detected by the prescan and due to the undiscovered flaws the recorded sync codes are disrupted, resulting in a failure to detect proper read timing. Such unfavorable Instances increase with the number of media flaws undetected by the prescan.

SUMMARY OF THE INVENTION

It is therefore an object of the present invention to properly detect a predetermined bit sequence recovered from a recording disk even though it is disrupted partially by a small media flaw.

According to a broader aspect of the present invention, there is provided a disk drive format controller in which data bits containing a bit sequence signifying a specified point of a data block are read from a disk. A reference bit sequence which is expected to be identical to the recovered bit sequence is generated. Each of the recovered bit sequence and the reference bit sequence is divided into M groups of K bits. The M groups of the recovered bit sequence and the corresponding M groups of the reference bit sequence are compared against each other to produce a coincidence signal for each pair of compared groups when there is a bit-by-bit match therebetween. A match detector determines if the coincidence signal is generated from all pairs of the compared groups or from N out of M pairs of the compared groups.

According to another aspect, the present invention provides a disk drive control system which comprises a code pattern generator for generating data bits containing a first bit sequence, a first subblock, a second bit sequence, a third bit sequence and a second subblock in the order named during a write mode, the first and second subblock comprising a user data block, and generating the bit sequences as first, second and third reference bit sequences during a read mode, the second and third bit sequences being spaced apart by a distance substantially corresponding to a flaw detected In the disk, each of the first, second and third bit sequences being of equal length and having M groups of K bits. A read/write means writes the data bits generated by the code pattern generator on a recording disk during the write mode and reads data bits from the disk during the read mode to produce copies of the first, second and third bit sequences and the first and second subblocks. M comparison circuits are associated respectively with the M groups of each of the first, second and third reference bit sequences from the code pattern generator means and associated respectively with the M groups of the copies of the first, second and third bit sequences from the read/write means. Each of the M comparison circuits produces a coincidence signal when there is a match between the K bits of the associated group of each reference bit sequence and the corresponding K bits of the associated group of the copy of each bit sequence. A match detector is coupled to output terminals of the M comparison circuits for producing a full match detect signal when each of the M comparison circuits is producing the coincidence signal or partial match detect signal when N out of the M comparison circuits is producing the coincidence signal. In response to either of the full and partial match detect signal, the skip timing of the read/write means is controlled to skip the media flaw and the read timing of the read/write means is controlled to read the first and second subblocks.

Since the number of media flaws undiscovered by a prescan is correlated with the number of discovered media flaws, the partial match detector of this invention is effective In minimizing failures to detect particular bit sequences.

In addition, since the recording density is higher in inner tracks than in outer tracks and the size of media flaws is Invariant, the value N Is preferably made to vary with a different track in the disk from which data bits are retrieved.

BRIEF DESCRIPTION OF THE DRAWINGS

The present invention will be described in further detail with reference to the accompanying drawings, in which:

FIGS. 7 and 8 are timing diagrams illustrating the operations of the disk drive control system during write and read modes, respectively.

DETAILED DESCRIPTION

Figure 1:
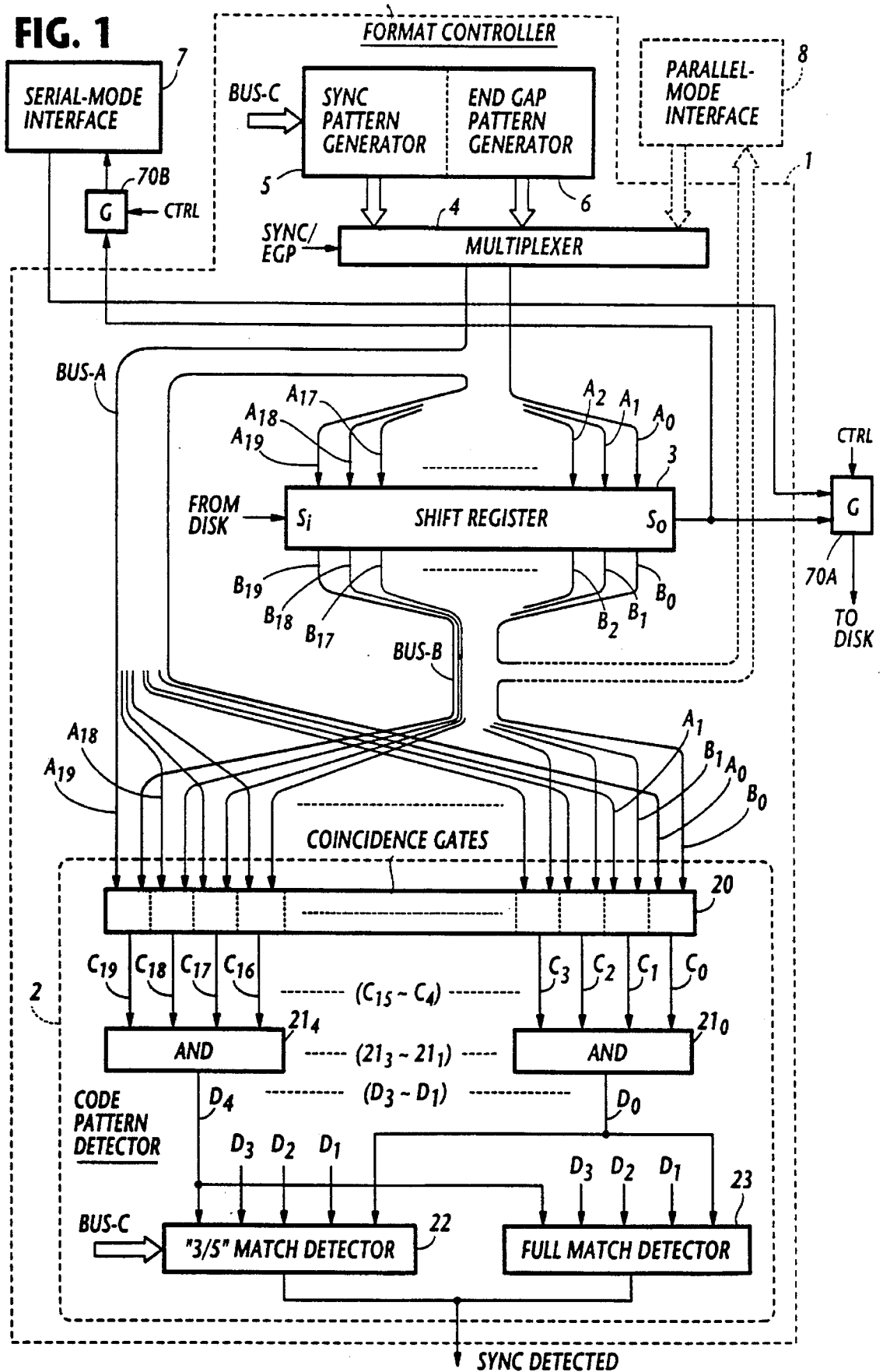
FIG. 1 is a block diagram of a format controller incorporating a code pattern detector of the present invention.

In FIG. 1, a disk drive format controller of the present invention is represented by reference numeral 1. The format controller 1 includes a 20-bit shift register 3 having a serial data input port Si to which serial data bits retrieved from a disk medium are supplied and a serial data output port So at which serial data bits appear. The internal stages of shift register 3 are connected, on the one hand, to the outputs of a multiplexer 4 and connected, on the other, through a data bus-B to the inputs of a comparator 20 of a phase detector 2 for making a bit-by-bit comparison between data bits supplied from the disk and a reference bit pattern supplied through a data bus-A from multiplexer 4 during read modes of the format controller.

It is the usual practice to store user data into sectored areas of a recording disk, and for this purpose the user data is segmented into blocks corresponding to sectors. Each block of the user data is preceded by a sync pattern to synchronize the read/write circuit with the stored data bits. The read/write system is adapted to prescan a disk surface for any media flaws. If one is detected, a user data block which might be disrupted by the flaw is split into first and second subblocks and spaced apart sufficiently to skip the flaw, and a second sync pattern is attached to the beginning of the second subblock.

To this end, a sync pattern generator 5 is provided for generating a first sync pattern during an interval immediately preceding the beginning of a user data block. If a media flaw is detected, the data block is divided into two subblocks and a second sync (or resync) pattern is generated immediately preceding it. According to the present invention, an end gap pattern generator 6 is provided for generating an end gap (E./G) pattern immediately following the first subblock to indicate the beginning of the media flaw. Typically, each of the sync patterns and the end gap pattern is of 20-bit length. Control signals for generating these predetermined bit sequences are supplied from a skip controller on a control bus-C in a manner as will be described.

User data bits can be supplied either in a serial or a parallel fashion. If a serial mode is used, write-In user data bits are supplied from a serial-mode interface 7 through a write gate 70A to the disk drive and read-out user data bits from the disk are supplied from the serial output port So of shift register 3 to the interface 7 through a read gate 70B. If a parallel mode is used, a parallel-mode interface 8 may be employed to supply write-in user data via multiplexer 4 to shift register 3 where it is serially shifted out through the output port So to write gate 70A and data supplied serially from the disk is supplied through the serial input port Si of shift register where it is converted to parallel form and supplied via data bus-B to interface 8.

Figure 2:
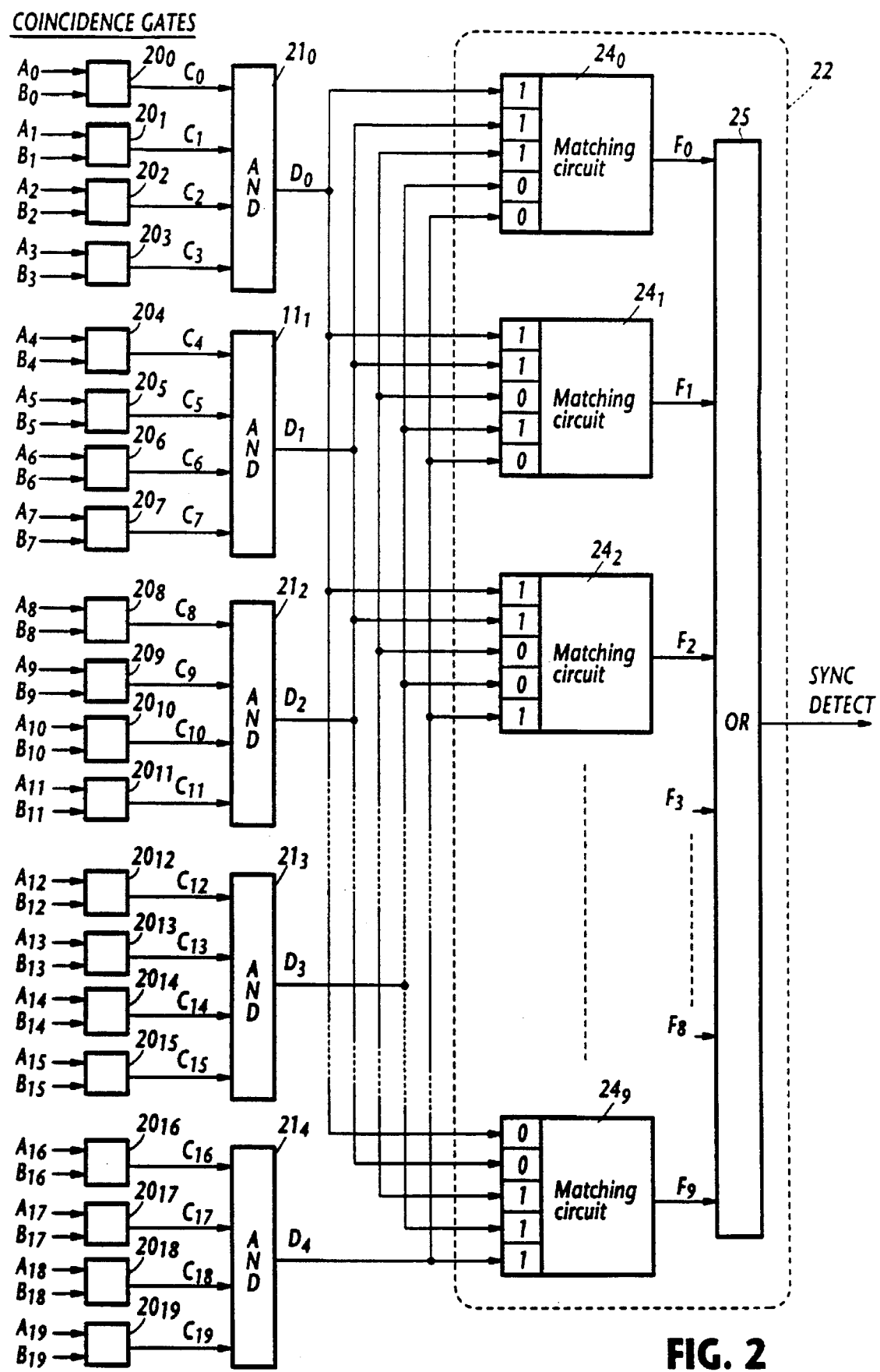
FIG. 2 is a block diagram illustrating details of the partial match detector of FIG. 1 with logic gate circuitry associated therewith.

As shown in FIG. 2, comparator 20 of the code pattern detector 2 comprises coincidence gates $20_0$–$20_{19}$ corresponding respectively to the stages of shift register 3. Each coincidence gate $20_i$ (where $i = 0, 1, 2, \ldots 19$) has a first input terminal that receives a bit $A_i$ from a corresponding output terminal of multiplexer 4 and a second input terminal for receiving a bit $B_i$ from the corresponding shift register stage to produce an output pulse $C_i$ which is 1 when there is a match between the inputs $A_i$ and $B_i$ and 0 otherwise. The outputs of the coincidence gates $20_0$–$20_{19}$ are divided into five like groups, or "segments", and supplied to AND gates $21_0$ through $21_4$, respectively, to produce segment signals, or simply, segments $D_0$ through $D_4$. Therefore, the output bits $C_0$ through $C_3$ of comparator 20 are applied to AND gate $21_0$ and the output bits $C_{16}$ through $C_{19}$ are applied to AND gate $21_4$.

The outputs of AND gates $21_0$ to $21_4$ are applied to a "n/m" match detector 22 and an AND gate, or full match detector 23. The "n/m" match detector 22 is one that produces a sync detect pulse when "n" out of "m" segments are at logic 1 level, whereas the full match detector 23 produces a sync detect pulse when all segments are at logic 1 level. For clarity, the partial match detector 22 is shown and described as a "3/5" match detector.

Figure 3:
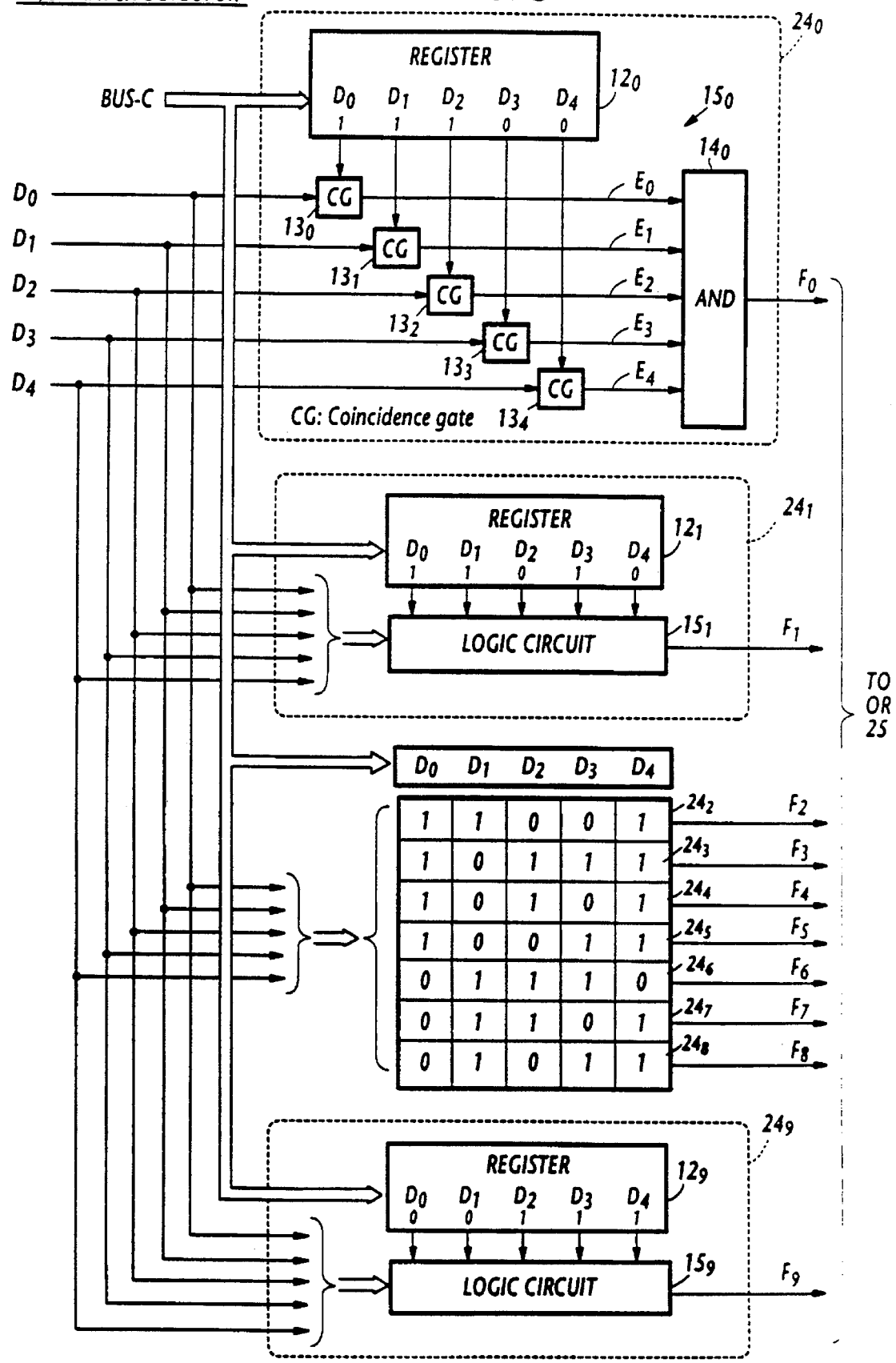
FIG. 3 is a schematic block diagram illustrating details of each matching circuit of FIG. 2.

In FIGS. 2 and 3, the 3/5 match detector 22 includes a plurality of matching circuits $24_0$–$24_9$ each having five input terminals coupled respectively to the outputs of AND gates $21_0$–$21_4$. The outputs of the matching circuits $24_0$–$24_9$ are connected to an OR gate 25 whose output is utilized as an indication of whether a sync or end-gap pattern is detected. Each matching circuit $24_j$ (where $j = 0, 1, \ldots 9$) includes a 5-bit register $12_j$ to which binary digits of one of 3-out-of-5 possible combinations are supplied through control bus-C, and a logic circuit $15_j$. The logic circuit $15_j$ comprises coincidence gates $13_0$–$13_4$ which are provided in each matching circuit corresponding to the binary digits stored in the register $12_j$, these coincidence gates being connected respectively to receive inputs from AND gates $21_0$–$21_4$ for detecting a match or mismatch with the corresponding bit of register 12 to produce an output $E_k$ (where $k = 0, 1, \ldots 4$) which is logic 1 if they match or logic 0 if they mismatch. The outputs $E_k$ of coincidence gates $13_0$–$13_4$ of each matching circuit $24j$ are connected to an AND gate $14j$ to produce an output $F_j$ which is logic 1 if all inputs $D_0$–$D_4$ from AND gates 21 match the binary digits stored in the register $12_j$, and is logic 0 if they mismatch. There are nine possible 3-out-of-5 combinations for all Inputs $D_0$–$D_4$ as shown in FIG. 2. Register $12_0$ stores a first set of "00111" for comparison with inputs $D_4$, $D_3$, $D_2$, $D_1$ and $D_0$ to produce a logic 1 for an output bit $F_0$ and register $12_1$ stores a second "01011" to produce a logic 1 for output $F_1$ and so on.

Figure 4:
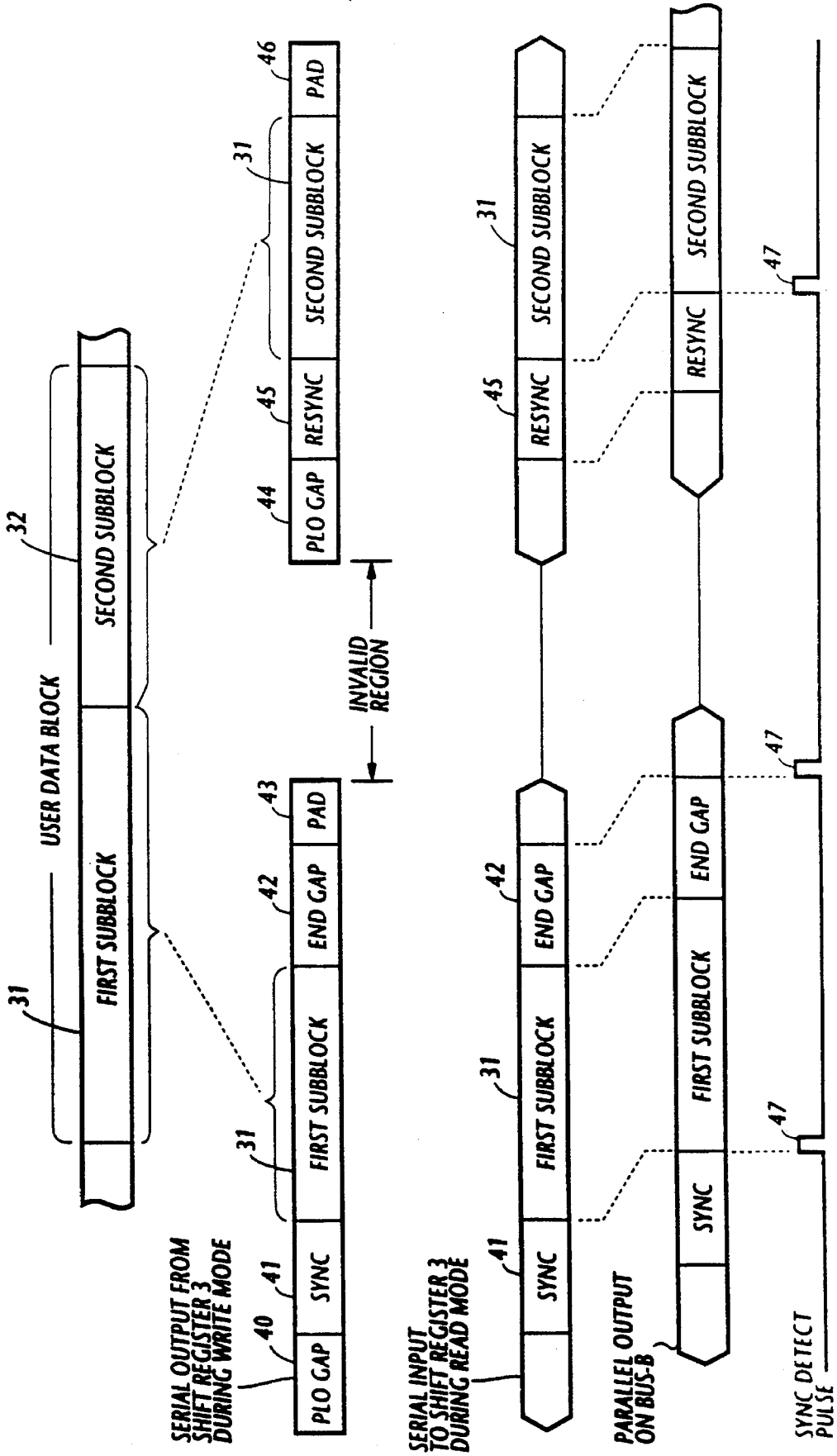
FIG. 4 is a timing diagram useful for describing the operation of the format controller of FIG. 1.

The read/write operation of the format controller of FIG. 1 will be briefly described with reference to FIG. 4 and the operation of the code pattern detector 2 will be fully described with reference to FIG. 5. If a media flaw was detected during a prescan operation, a user data block is divided into a first subblock 31 and a second subblock 32 during a subsequent write mode. The first subblock 31 is preceded by a sync field which contains a PLO (phase locked oscillator) gap code 40 and a sync pattern 41 and is followed by an end gap field containing an end gap code 42 and a pad (or meaningless dummy bit sequence) 43. The purpose of the PLO gap code is to enable a phase-locked loop (PLL) voltage-controlled oscillator, not shown, to synchronize with the bit sequence read out of the disk during read mode. The second subblock 32 is preceded by a resync field containing a PLO gap code 45 and a resync pattern 46 and is followed by a pad 46. The user data so organized is supplied from the serial output port So of shift register 3 and stored into a recording disk. During a read mode, the recorded signal is retrieved from the disk and sync and end-gap patterns 41, 42, 45 and user subblock data 31 and 32 are fed into shift register 3 through the serial input port Si where they are shifted and appear on the data bus-B. Each of the sync and end-gap patterns on data bus-B is compared by comparator 20 with the corresponding bit pattern supplied on data bus-A from the multiplexer 4.

If no media flaws other than those discovered by the prescan exist, the bit patterns on data bus-B are exactly the same as those supplied on bus-A and a sync detect pulse 47 is produced by the full match detector 23 for each of the code patterns.

Figure 5:
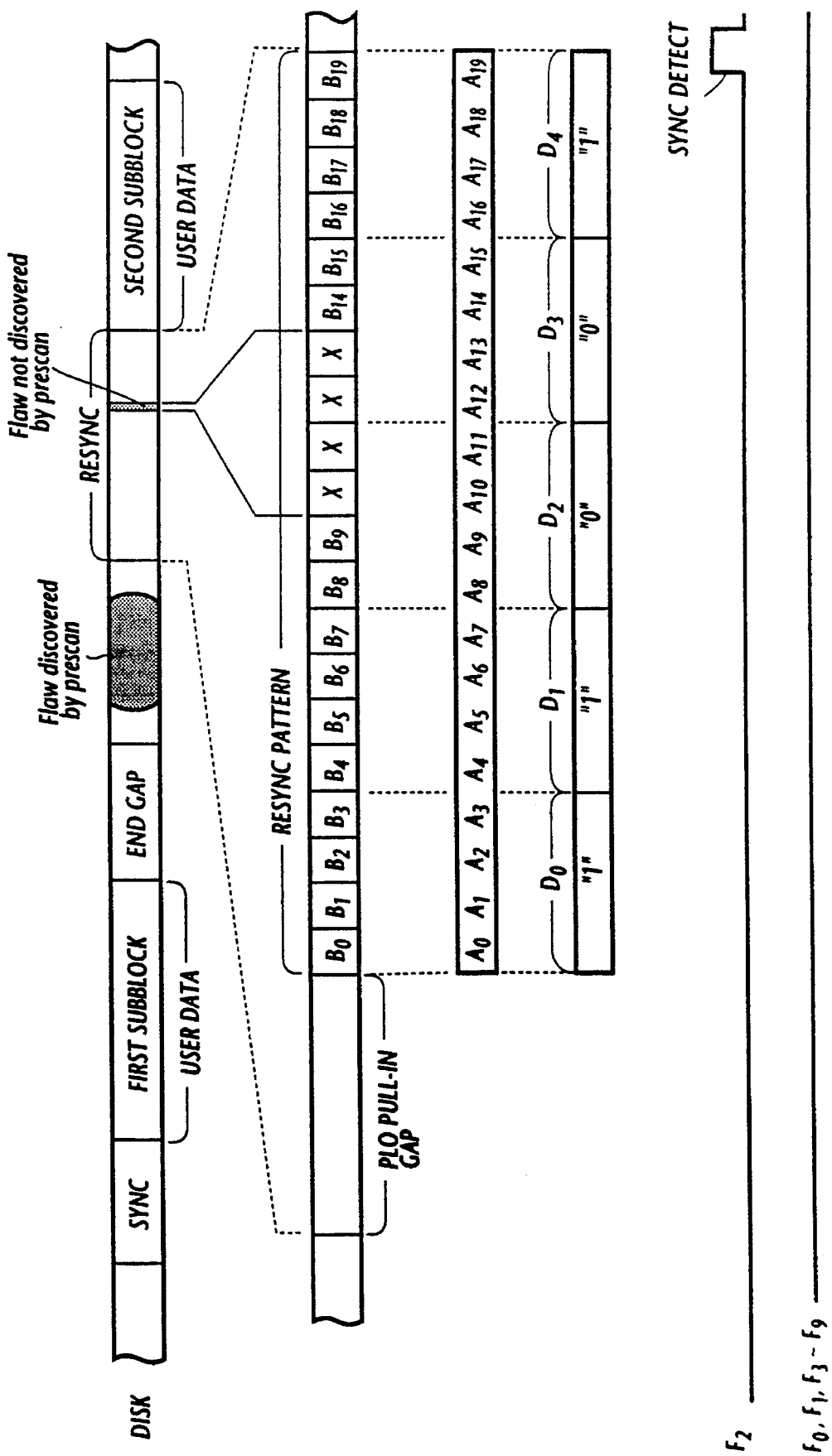
FIG. 5 is a timing diagram useful for describing the operation of the partial match detector.

Assume that there is a media flaw which was not discovered by the prescan and such a flaw exists in the storage area of resync pattern as shown in FIG. 5. If this media flaw disrupted bits $B_{10}$ through $B_{13}$ of the resync pattern, coincidence gates $20_{10}$–$20_{13}$ would produce logic-0 outputs and the outputs $D_2$ and $D_3$ of AND gates $21_2$ and $21_3$ are logic 0, while the other coincidence gates would produce logic 1 and hence the outputs of the other AND gates $21_0$, $21_1$ and $21_4$ are logic 1. Therefore, the "11001" matching circuit 242 of the 3/5 match detector 22 produces a logic-1 $F_2$ output which is used a sync detect pulse to establish resynchronization.

In the foregoing description, the partial match detector 22 is described as operating as a fixed value of ratio, i.e., 3/5. However, the recording density of a disk medium is highest in the innermost track and lowest in the outermost track.

Thus, the probability of bit errors due to small media flaws is higher in inner tracks than in outer tracks. It is preferable to change the bit sequence of sync (resync) and end-gap codes as the address point moves towards the inner tracks.

Figure 6:
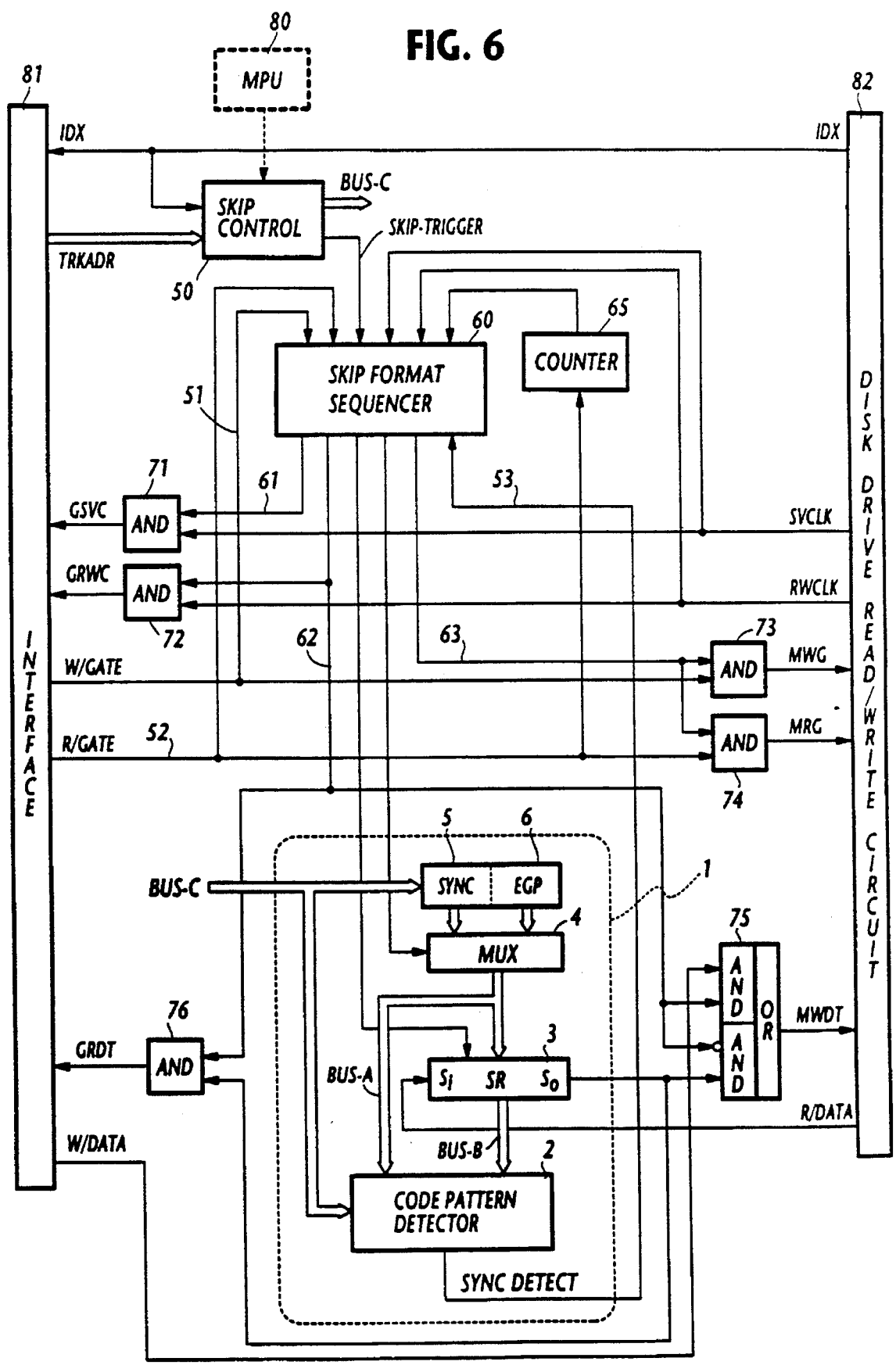
FIG. 6 is a block diagram of a disk drive control system incorporating the present invention.

FIG. 6 shows a control circuit for the format controller to allow it to control the n/m ratio of the partial match detector 22 as a function of the address location of data on the disk by setting the n-value of the ratio at higher values for outer tracks and setting it at lower values for inner tracks. Furthermore, because of the variable recording densities of the disk, it is also preferable to vary the sync (resync) and end-gap code patterns according to different track addresses so that data retrieved from the disk has a minimum peak shift value.

The control circuit is provided between a serial-mode interface 81 and a disk drive read/write circuit 82, and includes a skip controller 50, a skip format sequencer 60, a counter 65 and gates 71 to 76. Skip controller 50 is coupled to a microprocessor 80 to respond to instruction data therefrom to generate various command signals which are variable with the track address data.

During a write mode, a write gate pulse (W/GATE) is supplied from interface 81 to skip format sequencer 60 through control line 51 (time $t_1$, FIG. 7), and sequencer 60, in response to it, starts writing user's serial data supplied from the interface 81 through the W/DATA terminal. This is done by applying a logic 1 to lines 61 and 62 to enable gates 71, 72 and the upper side of gate 7S so that servo clock pulses (SVCLK) and read/write clock pulses (RWCLK) from the read/write circuit 82 are passed through AND gates 71 and 72 and thence through terminals GSVC (gated servo clock) and GRWC (gated read/write clock) to interface 81, and write data (W/DATA) from interface 81 are passed through MWDT (modified write data) gate 75 to the read/write circuit 82.

Skip controller 50 is responsive to a track address data (TRKADR) from interface 81 and an index signal IDX (indicating the starting point of a track) from the read/write circuit 82 to generate a "generate E/G pattern" command signal on bus-C and applies a skip-trigger pulse to skip format sequencer 60 which lasts for an interval from time $t_2$ to time $t_3$. During an interval between times $t_1$ and $t_3$, sequencer 60 applies a logic 1 to line 63 so that MWG (masked write gate) gate 73 is enabled to pass the write gate pulse ON/GATE) therethrough to read/write circuit 82.

During an interval between times $t_2$ and $t_3$, skip format sequencer 60 applies a logic 0 to lines 61 and 62 to enable the lower side of gate 75, and the user data block is divided and the recording of the user data is suspended. The "write E/G" command signal generated at time $t_2$ on bus-C causes the gap pattern generator 6 to produce an end gap pattern which is applied through bus-A to .shift register 3 where it is shifted out and passed through MWDT gate 75 to the read/write circuit 82. In this way, user's first subblock data and an end gap pattern are successively written into the disk.

During an interval between $t_3$ and $t_4$, the logic state of line 63 is low to disable MWG gate 73 in order to skip a suspected media flaw.

Sequencer 60 then responds to the trailing edge of the skip-trigger pulse by changing its operation to a "write PLO pattern" mode and subsequently to a "write resync pattern" mode. Likewise, skip controller 50 issues a "generate PLO pattern" command and then a "generate RESYNC pattern" command that are applied on bus-C to sync generator 5 to cause it to generate a PLO pattern first and then a resync pattern.

Sequencer 60 continues to apply logic 0 to line 63 until time $t_5$ to allow the PLO and resync patterns are successively written into the disk following the passage of the media flaw. During an interval between times $t_4$ and $t_6$ sequencer 60 applies a logic 1 to line 63 to enable the MWG gate 73 to pass the write gate (W/GATE) pulse from interface 81 to the read/write circuit 82. During an interval between times $t_4$ and $t_5$, sequencer 60 applies a logic 0 to line 62 to enable the lower side of MWDT gate 75 to write the PLO and resync patterns and during an interval between times $t_5$ and $t_6$ it applies a logic 1 to lines 61 and 62 to enable the upper side of the gate 75 to subsequently write the users second subblock data, while allowing servo and write clock pulses to be supplied through gates 71 and 72 to the interface 81.

As the address location of data to be stored proceeds to the inner tracks, sync (resync) and end gap patterns are altered accordingly in response to the command signals on control bus-C.

During a read mode, a read pulse (R/GATE) is supplied from interface 81 to sequencer 60 and counter 65 through control line 52 (at time $t_1$, FIG. 8). Sequencer 60 applies a logic 1 to line 63 to enable masked read gate (MRG) 74 to pass the R/GATE pulse to read/write circuit 82 during an interval between $t_1$ and $t_3$. On the other hand, counter 65 starts incrementing its count value until it reaches a value corresponding to the stages of shift register 3. During the interval between time $t_1$ and $t_2$ in which counter 65 is counting, sequencer 60 applies a logic 0 to lines 61 and 62 to disable gates 71 and 72 to inhibit the servo and read/write clock pulses from read/write circuit 82 from being applied to the interface 81.

When the address point approaches a media flaw previously discovered by a prescan, skip controller 50 applies a skip-trigger pulse to sequencer 60 at time $t_2$. During an interval between $t_2$ and $t_3$, sequencer 60 applies a logic 1 to line 62 to enable gated read data (GRDT) gate 76 to allow serial data from shift register 3 to be passed through this gate to interface 81, and enters a "search E/G pattern" mode, and skip controller 50 produces a "generate E/G pattern" command is supplied from skip controller 50 on control bus-C to the end gap pattern generator 6. In this way, the user's first subblock data and an end gap pattern are successively made to appear at the serial output So of shift register 3 and the former is fed into interface 81 and the latter is supplied on bus-B to the code pattern detector 2. If the end gap code pattern from shift register 3 matches the reference pattern supplied on bus-A in a manner described previously, a sync detect pulse 90 is generated and supplied from code pattern detector 2 on line 53 to sequencer 60.

Upon receipt of the sync detect pulse 90, sequencer 60 applies a logic 0 to lines 61 and 62 to disable gates 71, 72 and GRDT gate 76 to prevent clock pulses from read/write circuit 82 and serial data from shift register 3 from being applied to Interface 81. At the same time, sequencer 60 applies a logic 0 to line 63 to disable MRG (masked read gate) gate 74, which lasts until time $t_4$ to prevent the read (R/GATE) pulse from being applied to the read/write circuit 82. In this way, the read operation is interrupted.

After moving past the media flaw (time $t_4$), the logic state of skip trigger line is set to low, and sequencer 60 is notified of this fact to resume read operation by applying a logic 1 to line 63 to enable MRG gate 74 to read subsequent data from the disk into shift register 3. Skip controller 50 generates a "capture PLO" command signal and then a "search resync" command on control bus-C to cause the sync pattern generator 5 to produce a reference PLO code pattern followed by a reference resynchronization pattern. The resync pattern read from the disk into shift register 3 appears on bus-B for comparison with the reference resync pattern on bus-A. If they match, code pattern generator 2 generates and supplies a sync detect pulse 91 to sequencer 60. With the sync detect pulse 91 being received from code pattern detector 2, sequencer 60 skips the dummy data following the resync pattern, and at time $t_5$ it applies a logic 1 to lines 61 and 62 to clock the interface 81 and enable the GRDT gate 76 to read the user's second subblock data from shift register 3 into interface 81, while discarding the resync pattern.

As the address point moves towards the inner tracks, the n-value of the ratio n/m set into the match detector 22 by skip controller 50 is decreased and the ratio changes from ⅗ to ⅖, for example, so that sync pattern is detected even though two segments out of five coincide with the reference pattern.

The foregoing description shows only one preferred embodiment of the present Invention. Various modifications are apparent to those skilled in the art without departing from the scope of the present invention which is only limited by the appended claims. Therefore, the embodiment shown and described is only illustrative, not restrictive.

What is claimed is:

1. A disk drive control system comprising:

code pattern generator means for generating data bits containing a first bit sequence, a first subblock, a second bit sequence, a third bit sequence and a second subblock in the order named during a write mode, said first and second subblocks comprising a user data block, said code pattern generator means also generating bit sequences as first, second and third reference bit sequences during a read mode, said second and third bit sequences being spaced apart by a distance substantially corresponding to a flaw detected in the disk, each of said first, second and third bit sequences being of equal length and having M groups of K bits;

read/write means for writing the data bits generated by said code pattern generator means on a recording disk during said write mode and for reading data bits from the disk during the read mode to produce copies of said first, second and third bit sequences and said first and second subblocks;

M comparator means associated respectively with the M groups of each of said first, second and third reference bit sequences from the code pattern generator means and associated respectively with the M groups of the copies of said first, second and third bit sequences from the read/write means, each of the M comparator means producing a coincidence signal when there is a match between the K bits of the associated group of each reference bit sequence and the corresponding K bits of the associated group of the copy of each bit sequence;

match detector means coupled to output terminals of said M comparator means for producing a full match detect signal when each of the M comparator means is producing said coincidence signal and for producing a partial match detect signal when N comparator means out of the M comparator means is producing said coincidence signal; and means responsive to the full match detect signal and the partial match detect signal from said match detector means for controlling skip timing of said read/write means to skip said flaw and controlling read timing of said read/write means to read said first and second subblocks.

2. A disk drive control system as claimed in claim 1, wherein N is variable as a function of a location of a track in said disk from which data bits are retrieved.

3. A disk drive control system as claimed in claim 2, wherein N is of a relatively high value when data bits are read from outer tracks of the disk and is of a relatively small value when data bits are read from inner tracks of the disk.

4. A disk drive control system as claimed in claim 1, wherein each of said first, second and third bit sequences generated during the write mode has a different bit pattern when data bits are written in a different track of the disk, and each of said first, second and third reference bit sequences generated during the read mode has a different bit pattern when data bits are read from a different track of the disk.

5. A disk drive control system as claimed in claim 1, wherein said M comparator means comprise:

(M×K) first coincidence gates each having a first input for receiving a respective bit of said first bit sequence and a second input for receiving a respective bit of said second bit sequence and producing an output signal when the bits received at said first and second inputs are of identical logical values, where (M×K) is equal to the total number of bits contained in each of said first and second bit sequence, said (M×K) first coincidence gates being divided into M groups of K first coincidence gates; and M second coincidence gates associated respectively with said M groups of first coincidence gates, each of the second coincidence gates having K inputs connected respectively to outputs of the first coincidence gates of the associated group, said second coincidence gates producing said coincidence signal if all the outputs of the first coincidence gates of the associated group have identical logical values.

6. A method for detecting a predetermined bit sequence in a disk drive control system including code pattern generator means for generating, during a write mode, data bits containing a first bit sequence, a first subblock, a second bit sequence, a third bit sequence and a second subblock in the order named, said first and second subblocks comprising a user data block, and for generating, during a read mode, said first, second and third bit sequences as first, second and third reference bit sequences, said second and third bit sequences being spaced apart by a distance substantially corresponding to a flaw detected in the disk, and read/write means for writing the data bits generated by said code pattern generator means on a recording disk during said write mode and reading data bits from the disk during the read mode to produce copies of said first, second and third bit sequences and said first and second subblocks, the method comprising the steps of:

a) dividing each copy of said first, second and third bit sequences into M groups of data bits, and dividing each of said first, second and third reference bit sequences into M groups of data bits;

b) comparing said M groups of each copy of bit sequences with said M groups of each reference bit sequence on a bit-by-bit basis and producing a coincidence signal for each pair of compared groups when there is a bit-by-bit match between the compared groups;

c) determining that a predetermined bit sequence is detected if the coincidence signal is produced M times and determining that said predetermined bit sequence is detected when said coincidence signal is produced N times, wherein N is smaller than M; and d) controlling read timing of said read/write means to read said first subblock when the determination is made by the step (c) between the copy of the first bit sequence and the first reference bit sequence, controlling skip timing of said read/write means to skip said flaw when the determination is made by the step (c) between the copy of the second bit sequence and said second reference bit sequence, and controlling read timing of said read/write means to read said second subblock when the determination is made by the step (c) between the copy of the third bit sequence and said third reference bit sequence.

7. A disk drive format controller comprising:

means for reading data bits from the disk, said data bits containing a first bit sequence signifying a specified point of a data block, said first bit sequence having M groups of K bits;

reference bit sequence generator means for generating a second bit sequence which also signifies said specified point, said second bit sequence also having M groups of K bits;

M comparator means associated respectively with said M groups of said first bit sequence and associated respectively with the M groups of the second bit sequence, each of the M comparator means producing a coincidence signal when there is a match between the K bits of the associated group of the first bit sequence and the corresponding K bits of the associated group of the second bit sequence; and match detector means coupled to output terminals of said M comparator means for detecting a full match when each of the M comparator means is producing said coincidence signal and for detecting a partial match when N comparator means out of the M comparator means is producing said coincidence signal, wherein said M comparator means comprise:

(M×K) first coincidence gates each having a first input for receiving a respective bit of said first bit sequence and a second input for receiving a respective bit of said second bit sequence and producing an output signal when the bits received at said first and second inputs are of identical logical values, where (M×K) is equal to a total number of bits contained in each of said first and second bit sequences, said (M×K) first coincidence gates being divided into M groups of K first coincidence gates; and M second coincidence gates associated respectively with said M groups of K first coincidence gates, each of the second coincidence gates having K inputs connected respectively to outputs of the first coincidence gates of the associated group for producing said coincidence signal if all the outputs of the first coincidence gates of the associated group have identical logical values.

* * * * *

UNITED STATES PATENT AND TRADEMARK OFFICE
CERTIFICATE OF CORRECTION

PATENT NO.    : 5,461,633
DATED         : October 24, 1995
INVENTOR(S)   : Yoshiji KITAMURA It is certified that error(s) appears in the above-identified patent and that said Letters Patent is hereby corrected as shown below:

Col. 5, line 28, delete "7S" and insert --75--.

Signed and Sealed this

Twenty-third Day of April, 1996

Attest:

BRUCE LEHMAN

*Attesting Officer*    *Commissioner of Patents and Trademarks*